(12) United States Patent
Okada et al.

(10) Patent No.: US 6,292,238 B1
(45) Date of Patent: Sep. 18, 2001

(54) REFLECTION-TYPE LIQUID CRYSTAL APPARATUS

(75) Inventors: Shinjiro Okada, Isehara; Hidemasa Mizutani, Sagamihara, both of (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 08/906,904

(22) Filed: Aug. 6, 1997

(30) Foreign Application Priority Data

Aug. 6, 1996 (JP) .................................................... 8-207436

(51) Int. Cl.$^7$ .......................... G02F 1/1335; G02F 1/1343
(52) U.S. Cl. ................. 349/58; 349/64; 349/68; 349/113; 349/143
(58) Field of Search ................... 349/58, 61, 67, 349/113, 68, 64, 143; 345/905

(56) References Cited

U.S. PATENT DOCUMENTS

| | | |
|---|---|---|
| 4,492,432 | 1/1985 | Kaufmann et al. .................. 350/338 |
| 4,712,877 | 12/1987 | Okada et al. ...................... 350/350 S |
| 4,799,776 | 1/1989 | Yamazaki et al. .................. 350/350 |
| 5,381,256 | 1/1995 | Hanyu et al. ........................ 359/75 |
| 5,401,330 | 3/1995 | Saito et al. ......................... 136/259 |
| 5,495,352 | 2/1996 | Shinjo et al. ........................ 359/54 |
| 5,680,233 * | 10/1997 | Faris et al. ......................... 349/64 |
| 5,818,554 * | 10/1998 | Hiyama et al. ...................... 349/67 |

FOREIGN PATENT DOCUMENTS

| | | |
|---|---|---|
| 019 208 A1 | 11/1980 | (EP) . |
| 142 326 A1 | 5/1985 | (EP) . |
| 2 028 529 | 3/1980 | (GB) . |
| 06077510 | 3/1994 | (JP) . |

* cited by examiner

Primary Examiner—William L. Sikes
Assistant Examiner—Tai V. Duong
(74) Attorney, Agent, or Firm—Fitzpatrick, Cella, Harper & Scinto

(57) ABSTRACT

A reflection-type liquid crystal apparatus has a liquid crystal panel which includes a pair of a back side substrate and a viewer's side substrate disposed opposite to each other, and a liquid crystal disposed between the substrates. The back side substrate is provided with a plurality of scanning electrodes for applying a scanning signal to the liquid crystal, and the viewer's side substrate is provided with a plurality of transparent data electrodes for applying data signals to the liquid crystal. Further, the scanning electrodes are provided with a reflective and diffusive surface of a metal so as to reflect light incident thereto through the viewer's side substrate. The reflective and diffusive metal scanning electrodes formed on the back substrate are not only effective for providing improved drive characteristics because of its high conductivity but also provides uniform diffusive reflected light for providing a paper-like improved display quality.

19 Claims, 5 Drawing Sheets

REFLECTION-TYPE LIQUID CRYSTAL APPARATUS

FIELD OF THE INVENTION AND RELATED ART

The present invention relates to a reflective-type liquid crystal apparatus suitable for use in portable electronic appliances, such as a mobile computer and a PDA (personal digital assistant), particularly such a reflection-type liquid crystal apparatus capable of providing a uniform display luminance.

Hitherto, various optical display schemes utilizing liquid crystals have been proposed. For example, there has been known a scheme wherein a voltage applied to a pixel is controlled depending on an applied voltage-transmittance curve to obtain a desired level of luminance. This is well-known as a gradation control scheme for an active matrix-type LCD (liquid crystal display) using a TN (twisted nematic) liquid crystal.

On the other hand, there has been a noticeable trend of using a reflection-type liquid crystal apparatus as a portable or handy terminal or a paper-like display in recent years. In such a reflection-type liquid crystal apparatus including no backlight, it is important how to provide a sufficient brightness and a sufficient contrast. Incidentally, an ordinary liquid crystal apparatus using a TN-or STN-liquid crystal requiring two polarizers, a substantial loss of light quantity is caused, thus leaving problems regarding sufficient brightness and contrast.

For this reason, a proposal has been made so as to provide a liquid crystal apparatus capable of realizing little light quantity loss by using a single polarizer in the ECB (electrically controlled birefringence) scheme (Nakamura, et al; 18-th Liquid Crystal Forum, Preprint 3D110, 288 (1992).

On the other hand, in a conventional reflection-type liquid crystal apparatus, a reflection plate of, e.g., a mirror-reflecting aluminum sheet, is disposed on the back side of a liquid crystal panel (liquid crystal device), so that an environmental view is reflected on a display face due to the mirror, and an appropriate luminance cannot be attained in a viewing direction different from the direction in which an external light source is disposed. This can provide a detrimental defect for a portable device which is expected to always provide a uniform luminance even when used in any directions or positions. Further, this poses a problem also for a desktop-type apparatus that an area-type diffusive illumination light source is necessary and should be disposed on a proper position.

In order to alleviate the above-mentioned defect, it has been proposed to apply a diffusion sheet onto a viewer's side substrate. In this case, however, after the reflection, modulated light having passed a polarizer sheet again passes through a diffusion sheet, whereby the picture is blurred thereby. In other words, in order to well display a paper-like white display picture with reflected light from a mirror-face metallic substance, it is desirable to use a diffusion sheet with a large degree of diffusivity, which however causes another problem of blurring character or pictorial images.

SUMMARY OF THE INVENTION

In view of the above-mentioned problems, a principal object of the present invention is to provide a liquid crystal apparatus capable of a bright and good display while preventing reflective display of an environmental view.

Another object of the present invention is to provide a liquid crystal apparatus having a simple structure but allowing a uniform display luminance even when used in directions or positions.

According to the present invention, there is provided a liquid crystal apparatus including a liquid crystal panel comprising a pair of a back side substrate and a viewer's side substrate disposed opposite to each other, and a liquid crystal disposed between the substrates; wherein the back side substrate is provided with a plurality of scanning electrodes for applying a scanning signal to the liquid crystal, the viewer's side substrate is provided with a plurality of transparent data electrodes for applying data signals to the liquid crystal, and the scanning electrodes comprise a reflective and diffusive surface of a metal so as to reflect light incident thereto through the viewer's side substrate.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Figure 1:
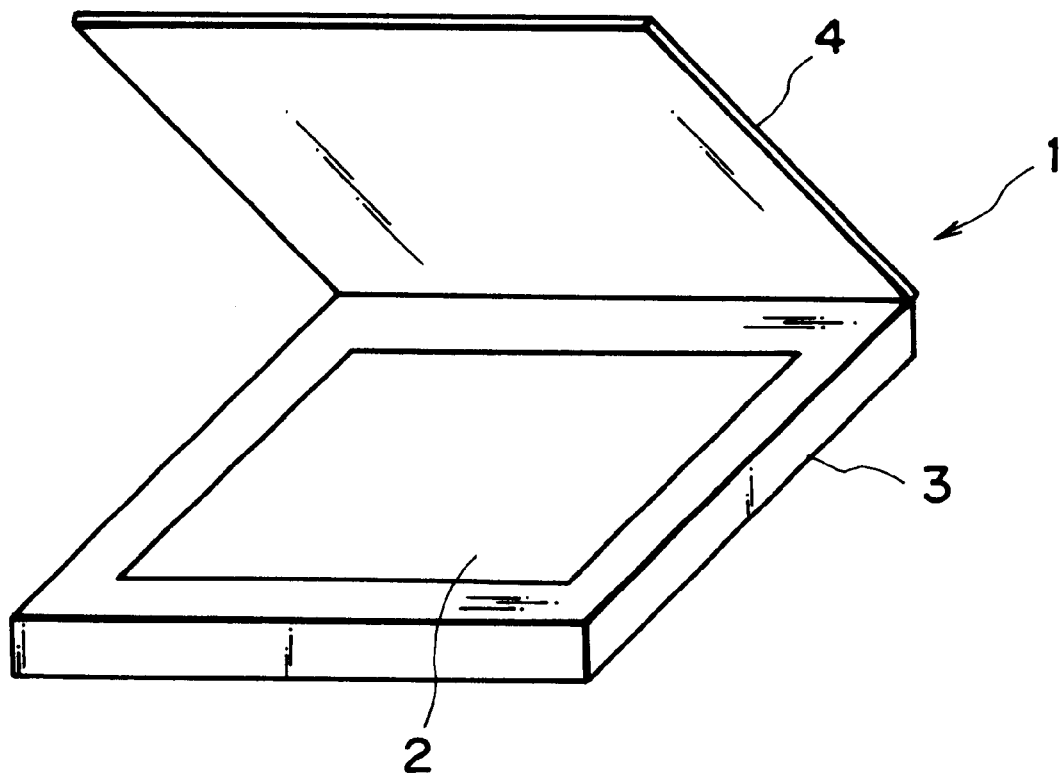
FIG. 1 is a perspective view of a liquid crystal apparatus according to an embodiment of the present invention
Figure 2:
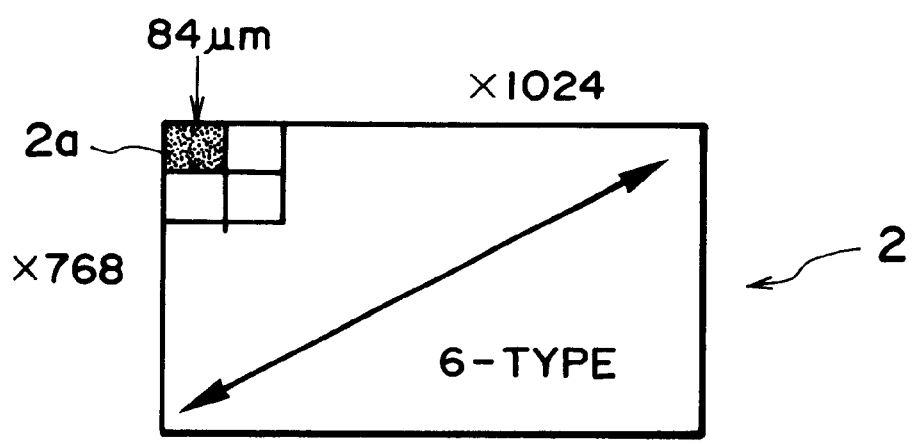
FIG. 2 is a schematic plan view of a liquid crystal panel contained in the liquid crystal apparatus.

FIG. 1 is a perspective view of a liquid crystal apparatus according to a first embodiment of the present invention. Referring to FIG. 1, a reflection-type liquid crystal apparatus 1 of 6-type (having an effective panel diagonal size of 6 inches) constituting a mobile information terminal, includes a liquid crystal panel 2 for picture or image display incorporated in a housing 2, and a lid 4 openably supported pivotally at one edge thereof with the housing 3.

The lid 4 is formed as a transmissive diffusion plate of, e.g., a semi-transparent resin, more specifically a semi-transparent white turbid plastic. The lid 4 is closed to protect the liquid crystal panel 2 when the liquid crystal apparatus 1 is not used but, in use, is opened to function as a diffusive area light source by uniformly diffusing external light incident thereto and causing the diffused light to be incident to the liquid crystal panel 2. The liquid crystal panel 2 has a display area composed of 1024×768 pixels each having a pixel size of 84 $\mu$m-square and formed by 1024 data electrodes and 768 scanning electrodes.

Figure 3:
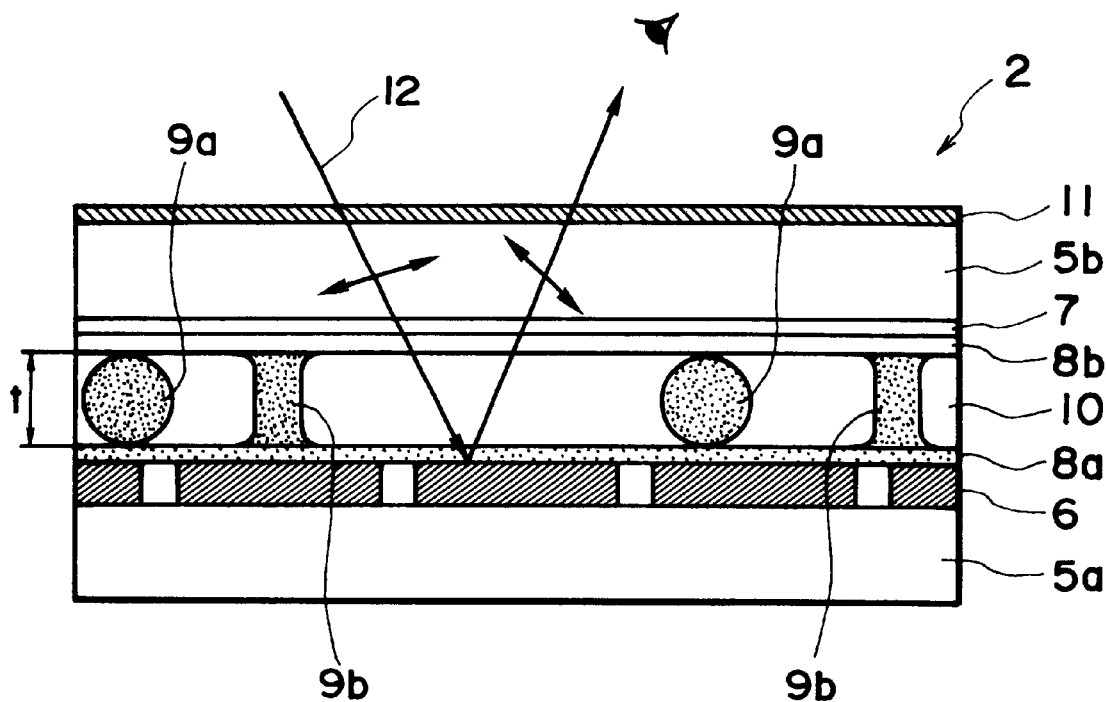
FIGS. 3 and 4 are schematic partial sectional views showing mutually perpendicular sections of the liquid crystal panel.
Figure 4:
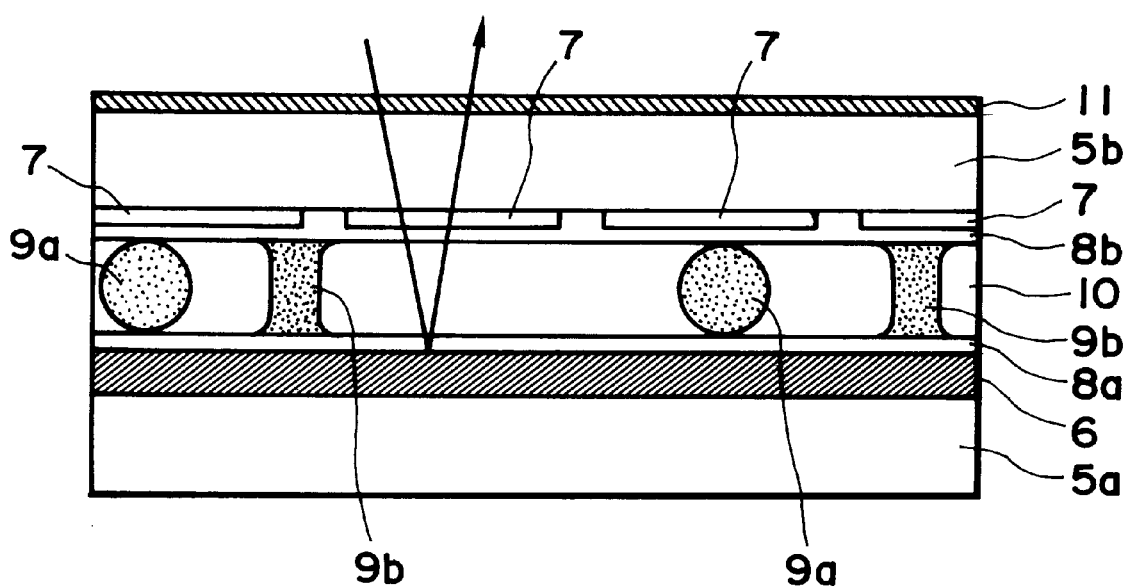

FIG. 3 is a partial sectional view of the liquid crystal panel 2, and FIG. 4 is another partial sectional view of the liquid crystal panel 2 showing a section perpendicular to that shown in FIG. 3.

Referring to FIGS. 3 and 4, the liquid crystal panel 2 includes a pair of a glass substrate 5a disposed on a back side and a glass substrate 5b disposed on a side of a viewer (as indicated by a human eye), scanning electrodes 6 formed on the back side substrate 5a, data electrodes 7 formed on the viewer's side substrate 5b, alignment films 8a and 8b formed over the scanning electrodes 6 and the data electrode 7, respectively, and gap adjusting means 9a and 9b for adjusting a gap between the substrates 5a and 5b including spacer beads 9a of, e.g., 1.42 μm-dia. spherical particles for preventing a gap narrowing and cured adhesive beads 9b of a thermosetting resin-type or ultraviolet curable resin-type for preventing a gap enlargement.

Incidentally, according to our experiments for driving, e.g., a ferroelectric liquid crystal 10, a scanning electrode 6 has a larger load than a data electrode 7, so that it suffers from a larger or severer distortion of drive voltage waveform (scanning signal waveform). In case where a drive voltage waveform is accompanied with such a large degree of distortion, normal switching of the liquid crystal 10 can be failed or the so-called drive margin can be unduly reduced, so that it is necessary to lower the resistance of each scanning electrode 6 so as not to cause such a distortion of drive voltage waveform.

For this reason, in the present invention, the scanning electrodes 6 are composed of a metal, e.g., Al (aluminum) in this particular embodiment, so as to reduce the resistance of the scanning electrodes 6. More specifically, in this embodiment, the scanning electrode 6 are formed in a pattern of stripes isolated from each other and having a width substantially equal to the width of each pixel 2a by a sequential photolithographic steps of Al film formation, photoresist application, pattern exposure, development of the exposed photoresist, etching of the exposed Al film and removal of the photoresist. In the present invention, the scanning electrodes 6 are formed of a metal not only for providing a lower resistance but also for providing a reflective and diffusive surface.

On the other hand, the data electrodes 7 have a smaller load and suffer little from a waveform distortion, so that the data electrodes 7 may be formed as transparent electrodes of, e.g., indium tin oxide (ITO) or other transparent electrode materials, such as tin oxide and indium oxide. The data electrodes 7 of ITO, etc., are formed in a pattern of stripes isolated from each other and disposed to intersect the scanning electrodes 6 at right angles so as to form a pixel at each intersection. By forming the data electrodes 7 of transparent electrodes and disposing them on the viewer's side substrate 5b, it becomes possible to realize a high-quality display at a high aperture rate over the entire display area.

The substrates 5a and 5b thus provided with the electrodes 6 an 7, respectively, may be further provided with an optional insulating film (not shown, for preventing a short circuit between the substrates) and alignment films 8a and 8b of, e.g., polyimide, subjected to an aligning treatment on one or both of the alignment films 8a and 8b, and then used for constituting a liquid crystal panel 2.

More specifically, in order to produce the liquid crystal panel 2, spacer beads of, e.g., silica, dispersed in an appropriate dispersing medium of, e.g., ethanol, may be dispersed on one of the substrates 5a and 5b at a density of 100–700 beads/mm$^2$, adhesive particles 9b of, e.g., an epoxy adhesive ("Toraypearl", available from Toray K.K.) may be dispersed on one or the other the substrate, and a sealing adhesive (of a thermosetting epoxy adhesive) may be applied at a periphery on one or the other substrate except for a liquid crystal-injection port. Then, the substrates 5a and 5b are applied to each other and the adhesive beads 9b and the sealing adhesive are cured under heating while the substrates are pressed to each other to form a blank cell having a cell gap retained by the spacer beads 9a of e.g., ca. 1.4 μm, which is then filled with a ferroelectric liquid crystal 10 under heating and, after gradual heating, the liquid crystal injection port is sealed with, e.g., a two liquid-type epoxy adhesive to form a liquid crystal panel 2. During cooling to its chiral smectic phase, the ferroelectric liquid crystal 10 is aligned owing to the function of the alignment films 8a and 8b to provide a surface-stabilized ferroelectric liquid crystal device structure.

In this embodiment, the liquid crystal panel 2 thus constituted provides a ferroelectric liquid crystal device operated in a birefringence mode. The ferroelectric liquid crystal may comprise a liquid crystal which has a spontaneous polarization and can be switched by application of an external electric field, typically a chiral smectic liquid crystal. A preferred type of chiral smectic liquid crystal may comprise a chiral smectic liquid crystal composition including at least one species of fluorine-containing mesomorphic compound which has a chemical structure comprising a fluorocarbon terminal chain (or portion) and a hydrocarbon terminal chain (or portion) connected with a central core (or mesogen) and has a smectic mesophase or latent smectic mesophase.

A specific example of such a chiral smectic liquid crystal composition may be given as a mixture of the following compounds A–E:

Compounds

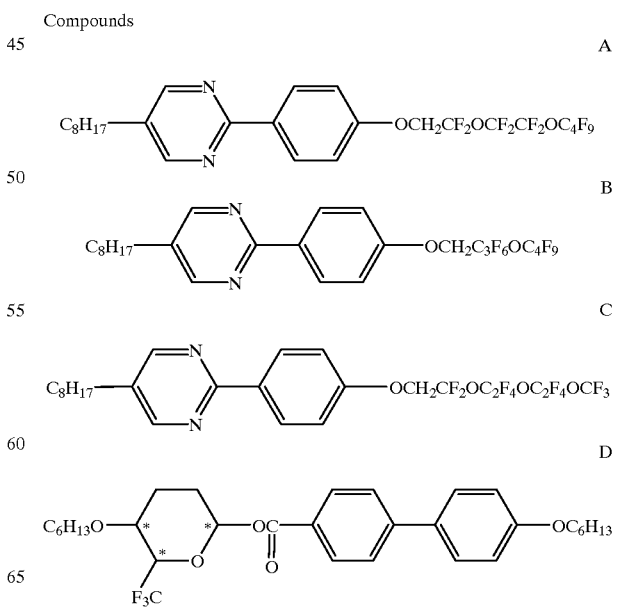

-continued

E

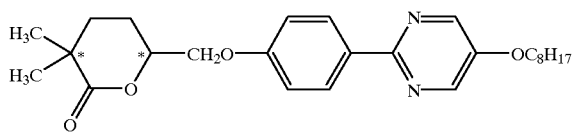

A specific composition obtained by mixing the compounds A–E in weight ratios of A/B/C/D/E=45/15/30/5/2 provided the following parameters.

Phase transition series (° C.):

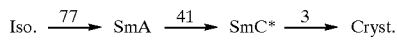

Tilt angle $\textcircled{H}$ (at 30° C.)=24.4 deg.

Spontaneous polarization Ps (at 30° C.)=−31.1 nC/cm$^2$ The composition further showed a refractive index anisotropy of ca. 0.1 at 20–40° C. Accordingly, if the liquid crystal layer thickness is set at ca. 1.4 μm, then the retardation of the liquid crystal layer may be set to ca. 0.14 μm, which is roughly ¼ of the visible light wavelength.

Referring again to FIGS. 3 and 4, the liquid crystal panel 2 further includes a polarizer film 11 as a polarizer applied onto the surface of the viewer's side substrate 5b, so that the incident light to the liquid crystal panel 2 including the light from the lid 4 is polarized though the polarizer film 11 and then incident to the liquid crystal layer 10.

The liquid crystal layer thickness t may be set to at most 2 μm so that the retardation of the liquid crystal layer when placed in a substantially uniaxial alignment state has a value within a range of ¼ of the visible light wavelength. Accordingly, when the incident light 12 is reflected by the scanning electrodes 6 and again passes through the liquid crystal layer 10, the retardation amounts to ½ of the visible light wavelength. As a result, when the reflected light again passes through the polarizer film 11, a picture corresponding to written data becomes visible to the viewer.

Figure 5:
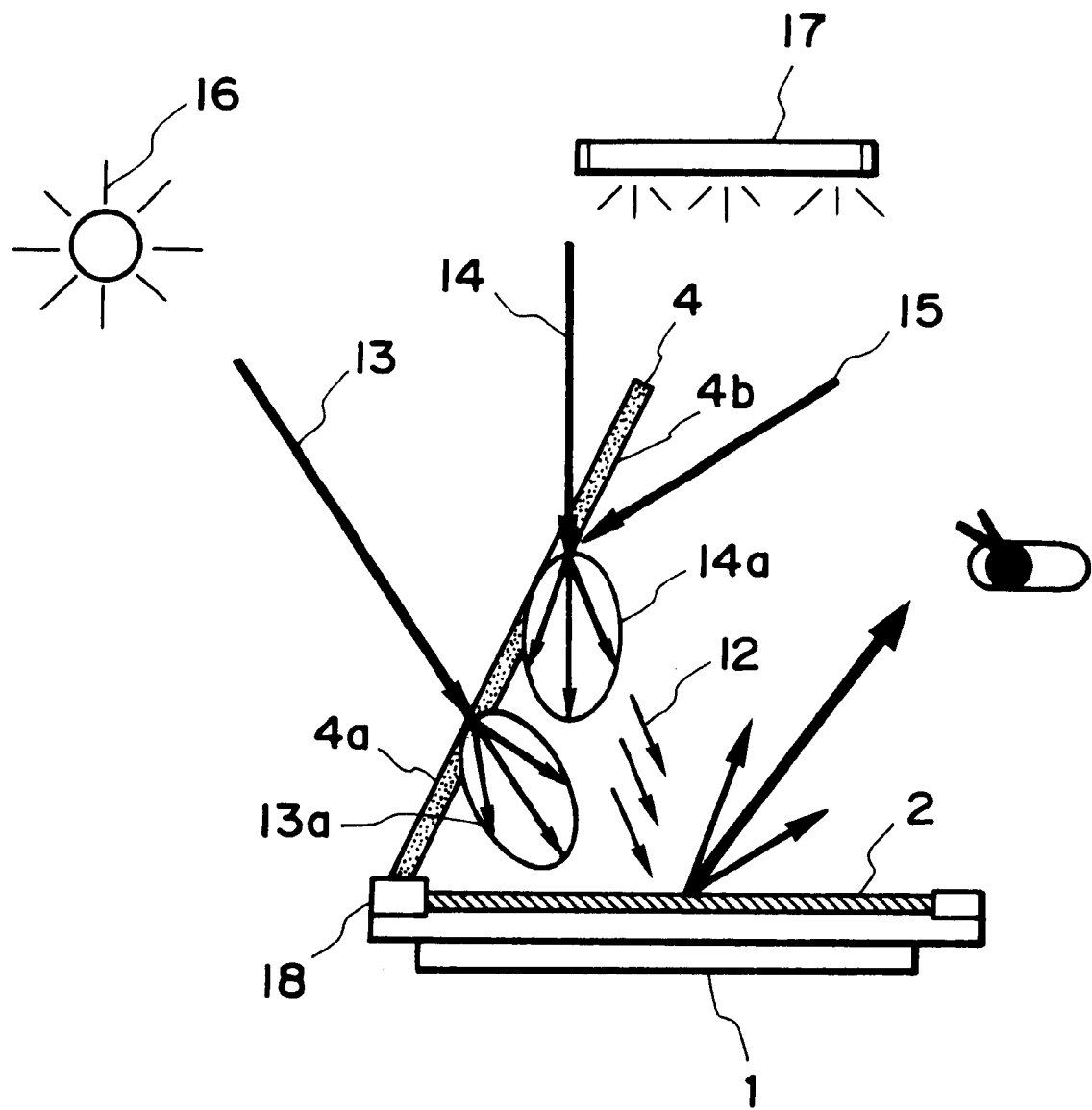
FIG. 5 is an illustration of illumination light around the liquid crystal apparatus, wherein external light incident to a lid surface is converted into diffusive light when passed through the lid, and external light incident to the lid from a viewer's side is converted to diffusive light when reflected at the lid.

The lid 4 composed of a diffusive sheet allows external light from the sun 16 or a room illumination light source 17 to pass therethrough while diffusing the external light, thus functioning as a diffusive light source. The lid 4 may be opened at an acute angle and held at the opened state by a holder 18 as a holding or supporting means so as to allow the viewer to well observe the entire liquid crystal panel 2 (FIG. 5).

In the state of the lid 4 being held by the holder 18, light fluxes 13 and 14 from the sun 16 and the room illumination light source 17 are incident from the surface 4a and passes through the lid 4 to form diffusive light 13a and 14a. On the other hand, other external light 15 incident from the viewer side is reflected from the back surface 4b to form diffusive light. As a result, external light is effectively used as diffusive light incident light to the liquid crystal panel 2 regardless of the position of the light source.

Further, diffused light 12 entering the liquid crystal panel 2 from the lid 4 as a diffusive area light source is passed through the polarizer film 11 and the liquid crystal 10, reflected and diffused by the scanning electrodes 6, and thereafter passed through the liquid crystal 10 and the polarizer film 11 to be emitted as image light uniformly observable by the viewer.

As described above, by forming the scanning electrode surface of a reflective and diffusive metal surface, a uniform display luminance free from a dark-bright irregularity and reflection of an environmental view on the liquid crystal panel face can be attained regardless of the position and direction of the viewer relative to the panel, thus providing a paper-like image quality. Further, because of the presence of the lid 4, peculiar light rays such as sunlight is prevented from directly entering the liquid crystal panel surface and is reflected thereat to enter the viewer's eyes, thus providing a good and easy-to-see picture. The effect is essentially attained by a very simple structure including one polarizer film 11, transparent data electrodes and metal scanning electrodes at a low production cost.

This embodiment using a surface-stabilized ferroelectric liquid crystal, compared with the apparatus using a TN- or STN-liquid crystal, provides the following advantages:

(1) Because of a memory characteristic, a low-power drive becomes possible especially for a handy terminal having a low rewrite-frequency.

(2) Because of a simple matrix structure including transparent data electrodes formed on the viewer's side substrate 5b and metal scanning electrodes also functioning as a reflection surface formed on the backside substrate 5a, it is possible to realize a high definition display (adapted for, e.g., VGA).

(3) The use of a ferroelectric liquid crystal allows a quick scrolling, and a simple electrode structure (requiring a minimum number of masks for electrode production) allows a low production cost.

In the above-described embodiment, the lid 4 has been descried as being composed of a semitransparent material so as to utilize both transmitted and reflected light therethrough or thereat because more transmitted light 13a and 14a is available from light 15 incident from the viewer's side in ordinary cases. However, it is also possible to form the lid 4 of a reflection-type diffusive sheet so as to reflect and diffuse external light incident to the back side of the lid 4 principally from the viewer's side to form illumination light for the liquid crystal panel 2. In this case, external light incident to the front side of the lid cannot be used as illumination light but, on the other hand, the protective function of the lid may be enhanced according to appropriate material selection.

The diffusive member constituting the lid 4 may be formed by dispersing within a matrix resin constituting the lid 4 fine particles having a different refractive index from that of the matrix resin. Such particles may be composed of materials, such as $MgF_2$, $CaF_2$, $SiO_2$, $TiO_2$, MgO, $SnO_2$, polytetrafluoroethylene, polydivinylbenzene and polysulfone. Alternatively, a diffusive lid 4 may be composed of a surface-roughened glass sheet, acrylic resin sheet, etc.

Figure 6:
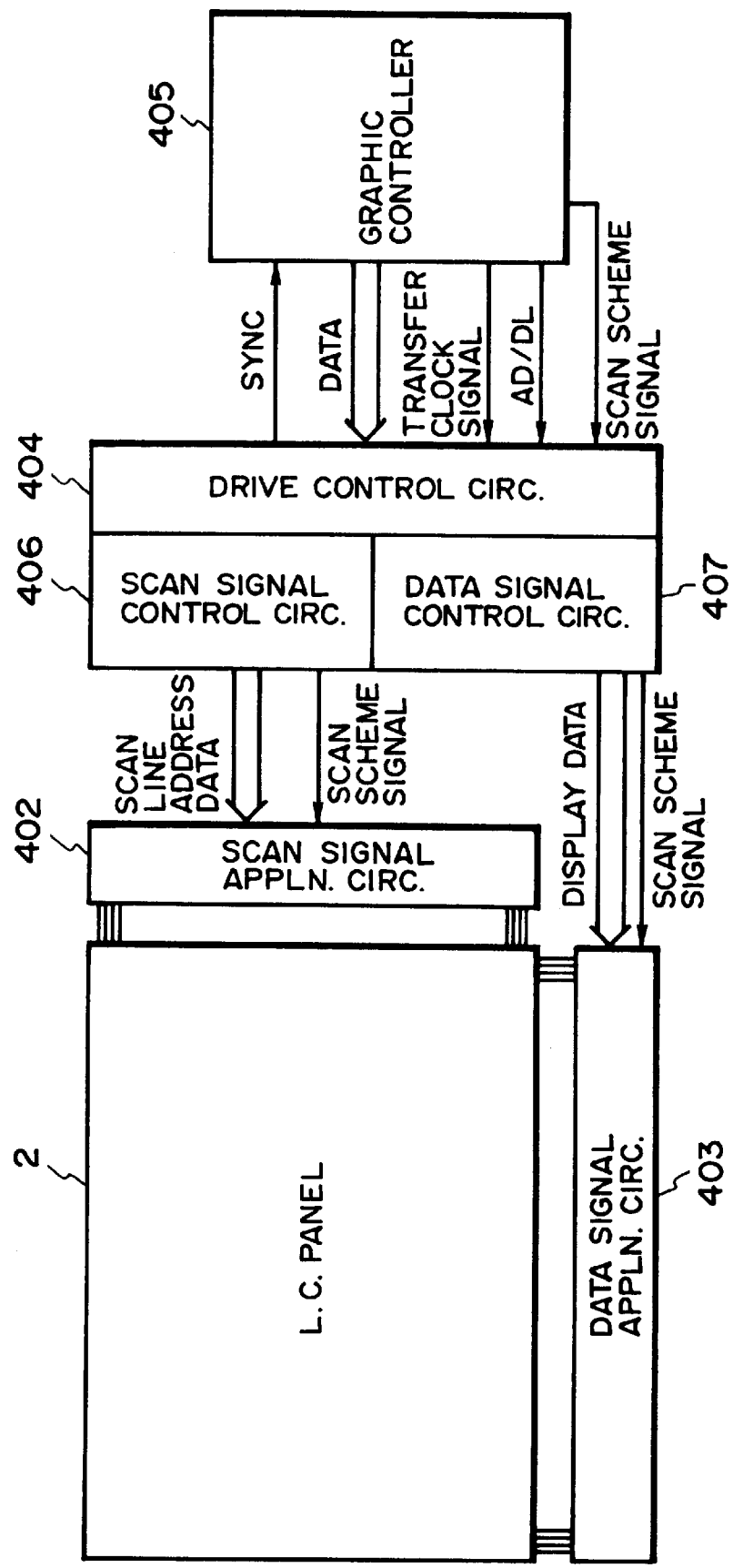
FIG. 6 is a block diagram of a liquid crystal apparatus according to the invention including a drive control for liquid crystal panel.

The above-described liquid crystal apparatus 1 may include, e.g., a drive control system as shown in FIG. 6 for driving a liquid crystal panel 2.

Figure 7:
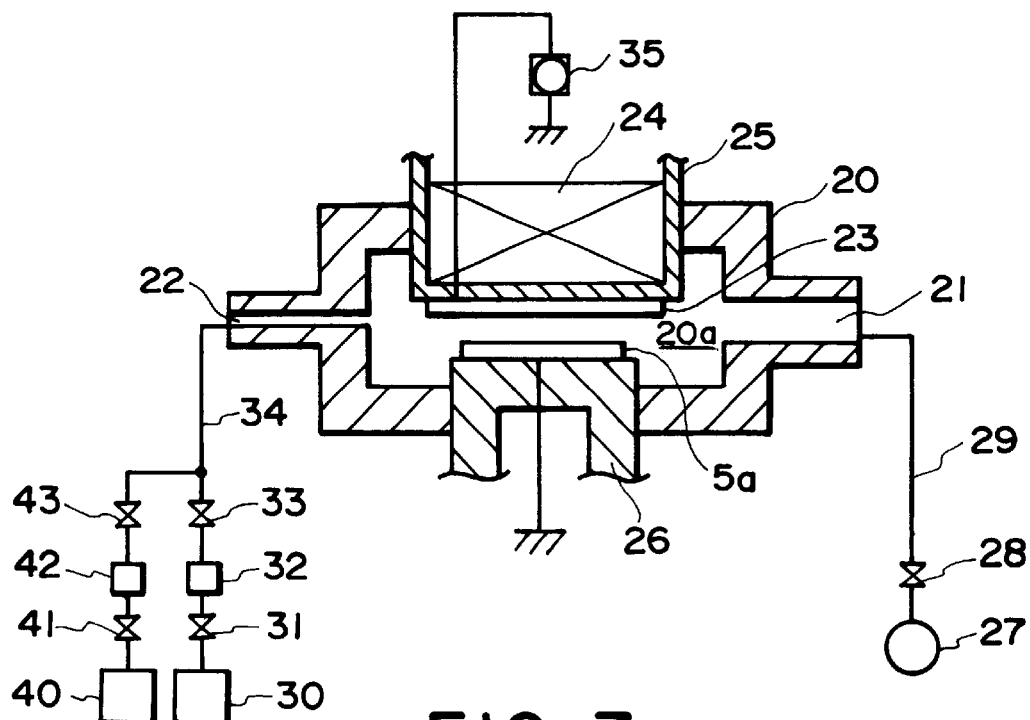
FIG. 7 is an illustration of an apparatus for forming an electrode metal film used in the present invention

Referring to FIG. 7, in the liquid crystal apparatus 1, a liquid crystal panel 2 is connected to a scanning signal application circuit 402 and a data signal application circuit 403, which are further connected sequentially to a drive control circuit 404 and a graphic controller 405. From the graphic controller 405, data and a scanning scheme signal are supplied via the drive control circuit 404 to a scanning signal control circuit 406 and a data signal control circuit 407. Among them, the data is converted into a scanning line address data and display data by the scanning signal control circuit 406 and the data signal control circuit 407, and the remaining scanning scheme signal is sent as it is to the scanning signal application circuit 402 and the data signal application circuit 403.

The scanning signal application circuit 402 applies a scanning signal determined based on the scanning scheme signal to a scanning electrode determined based on a scanning line address data, and the data signal application circuit 403 applies data signals determined depending on a combination of a display content of white or black conveyed by the display data and the scanning scheme signal to the data electrodes.

As described above, in the above-described embodiment, transparent data electrodes are formed on the viewer's side substrate, and scanning electrodes on the back side substrate are provided with a light-diffusive and reflective metal surface in a liquid crystal panel. Further, a lid covering the liquid crystal panel in its closed state is composed of a diffusive sheet and, when opened, at least external light incident to its external or outer surface is transmitted and diffused to form diffusive light used for illuminating the liquid crystal panel, whereby a uniform luminance display can be realized without reflection of an environmental view regardless of the position and direction of the viewer relative to the liquid crystal panel.

FIG. 7 illustrates a film-forming apparatus suitable for forming a reflective and light-diffusive electrode used in the present invention.

Referring to FIG. 7, the film-forming apparatus includes a casing 20 defining a chamber 20a for accommodating a substrate 5a and a sputtering target 23, an exhaust port 21 for evacuating the chamber 20a connected to exhaust means including a vacuum pump 27, a valve 28 and an exhaust pipe 29. The apparatus further includes a supply port 22 for supplying a sputtering treatment gas into the chamber 20a connected to gas supply means including gas bombs 30 and 40, valves 31, 33, 41 and 43, mass-flow controllers 32 and 42 and a supply pipe 34.

In the chamber 20a, the substrate 5a is supported on a substrate support 26 in which a heater, a cooler and a temperature sensor (any not shown) are embedded to effect a temperature control of the substrate 5a.

Opposite the substrate support 26 is formed a target support 25 for downwardly supporting the sputtering target 23. The target support 25 is equipped with a cooler (not shown) embedded therein. The apparatus further includes a magnet 24 for magnetron sputtering, and a DC or RF (radio frequency) power supply 35 for causing a glow discharge between the target 23 and the substrate 5a to generate a plasma of the treatment gas.

The electrode film formation may be performed in the following manner.

A metal target 23 of Al or Ag is affixed to the target support 25, and a substrate 5a is affixed to the substrate support 26. Then, the chamber 20a is evacuated to a pressure on the order of $1.0 \times 10^{-3}$ Pa–$2.0 \times 10^{-4}$ Pa by the exhaust means.

Then, a sputtering gas, such as Ar, He, Ne or Xe, and also a minute amount of $O_2$, $CH_4$ or $CO_2$ are supplied from the gas supply means to establish a pressure on the order of 0.1 Pa–2.0 Pa. Then, a power is supplied from the power supply 35 to cause a glow discharge between the target 23 and the substrate 5a. At this time, the substrate 5a may be held at a temperature of ca. 100–250° C.

In this instance, the supply rate of the additive gas ($O_2$ or $CO_2$) may be controlled so as to provide the thus-formed metal with surface unevennesses having an average difference in height of ca. 0.1–0.2 $\mu$m.

As a specific experiment, 0.5 $\mu$m-thick Al films were formed on glass substrates 5a at a DC supply voltage of 3.0 KW and a substrate temperature of 200° C. and under a chamber pressure of 0.4 Pa while supplying Ar gas and variable concentrations of carbon dioxide. The surface unevennesses (average differences in height between projections and indentations) and mirror reflectances for a light having a wavelength of 550 nm of the thus-formed Al films were measured and plotted versus the $CO_2$ concentrations as shown in FIG. 8.

More specifically, the mirror reflectance values referred to herein are based on values measured by using a mirror reflectance meter (made by Murakami Shikisai Kenkyusho K.K.) for measuring mirror reflectances according to the Sharp Little method including an integrating sphere having an inner diameter of 200 mm, having an inner wall coated with $BaSO_4$, a lateral hole for introducing illumination light having a wavelength of 550 nm issued from a halogen lamp, and passed through a filter, a lower slot where a sample (or a reference sheet) is exposed, and an upper slot (disposed opposite to the lower slot) where a photosensor is disposed.

Figure 8:
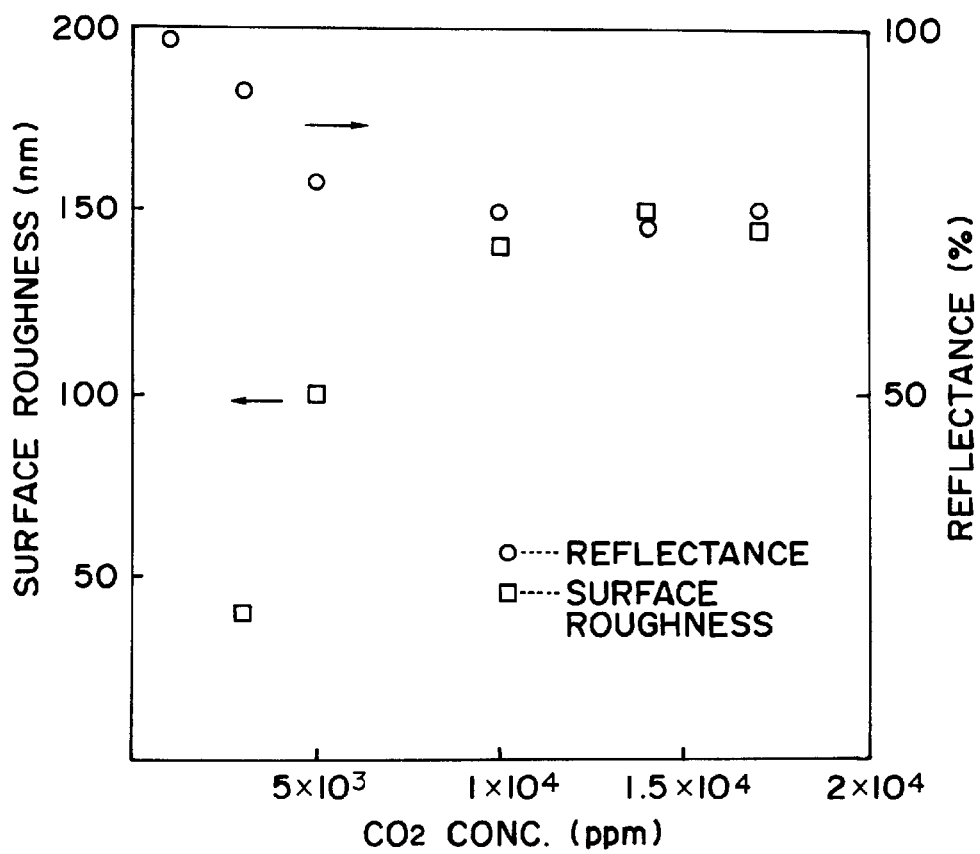
FIG. 8 is a graph showing $CO_2$ concentration-dependence of surface roughness and mirror reflectance of metal films.

As is understood from FIG. 8, as the $CO_2$ concentration increased, the Al films showed an increased surface roughness and a lower mirror reflectance. This is because the increased roughness of the Al surface promoted the scattering of incident light to decrease the mirror reflection component.

By thus lowering the mirror reflectance of the metal films by a sputtering with a sputtering gas containing $O_2$ and C, the resultant film surface may be provided with a diffusion characteristic closer to that of paper generally called "white turbidity". Incidentally, the mirror reflectance of a metal film can also be lowered by causing crystal grain growth to form unevennesses, but such a lowering of mirror reflectance due to mere crystal grain growth is accompanied with blackening different from "white turbidity" so that it is unsuitable for providing a reflective and diffusive metal film surface.

According to our experiments, a metal film showing a mirror reflectance of 80% or below is suitable as one forming a diffusive and reflective surface in view of the brightness, contrast and viewing angle characteristic of the resultant liquid crystal panel. Even in such a case, the loss of polarity at the reflecting surface could be substantially ignored.

When such scanning electrodes 6 forming a diffusive and reflective surface having such a reflection characteristic are used, the light supplied from the sun 16 and illumination light source 17 (FIG. 5), passing through the liquid crystal 10 and incident to the surface of the scanning electrodes 6 is reflected as diffused light, but the blurring of the reflected image can be obviated because the reflecting surface and the diffusion surface are completely identical to each other. When the metal film is provided with a diffusion characteristic by surface roughening caused by inclusion of oxygen into the sputtering gas, the resultant metal film functions as a diffusive area light source emitting light uniformly incident to the viewer's eyes, to that the viewer can observe a paper-felt image quality free from bright-dark irregularity on the panel face.

In the above embodiment, the case of forming Al electrodes has been described, but it is also possible to similarly form electrodes of aluminum alloys, such as Al—Si, Al—Ti, Al—Cu, Al—Si—Ti, Al—Si—Cu and Al—Ti—Cu. Also in this case, it is preferred to form a light-diffusive and reflective electrode of a metal film containing oxygen and/or carbon by reactive sputtering introducing additive gas, such as $O_2$, $CH_4$, $CO_2$, etc.

It is also possible to use Ag instead of Al for forming a light-diffusive and reflective electrode.

More specifically, in another experiment, an Al film and an Ag film were respectively formed on glass substrates by sputtering at a DC power supply of 2.0 kW, a substrate temperature of 200° C., a pressure of 0.4 Pa and a $CO_2$ concentration of 3000 ppm. The respective films showed the spectral mirror reflectances shown in the following Table 1:

TABLE 1

| | Reflectance (%) | | | |
|---|---|---|---|---|
| | Wavelength (nm) | | | |
| Metal | 400 | 500 | 600 | 700 |
| Ag | 94.8 | 97.7 | 98.1 | 98.5 |
| Al | 92.4 | 91.8 | 91.1 | 89.9 |

As is shown in Table 1 above, silver (Ag) is liable to provide a higher reflectance so that it is preferable to increase the amount of additive gas, such as $CO_2$, in the reactive sputtering so as to provide a lower mirror reflectance. Further details of silver (Ag) film formation by sputtering will be available from JP-A 6-77510 or U.S. Pat. No. 5,401,330.

Further, among metal electrode film materials usable in the present invention, a metal principally comprising Al or Ag and containing oxygen and carbon is preferred because of easy etchability and good sectional shape of the etched pattern in the wet etching. As a result, it is easy to form a patterned electrode having a width of ca. 1 $\mu$m to 500 $\mu$m and with a desired sectional shape. These metal electrodes further exhibit an excellent adhesion with an inorganic or an organic insulating film formed thereon.

In another experiment, sputtering of Al target was performed at various $CO_2$ concentrations to form four Al films (Samples 1–4) on glass substrates. These films were subjected to measurement of mirror reflectance, an etching test with an etchant mixture comprising nitric acid, phosphoric acid, acetic acid and water (in volume ratios of 52.3/1.0/4.5/22.2) to form a 5 $\mu$m-line/5 $\mu$m-spacing alternate stripe electrode pattern at an etching rate of 10 mm/sec at 30° C. followed by washing with pure water and drying with blown dry air, and a 0.6 $\mu$m silicon oxide ($SiO_2$) coating test.

The results are shown in th following Table

TABLE 2

| Sample | $CO_2$ conc. (ppm) | Mirror reflectance | *1 Etching residue | *2 Peeling of $SiO_2$ film |
|---|---|---|---|---|
| 1 | none | 99 (%) | observed | occurred |
| 2 | 3000 | 91 | none | occurred |
| 3 | 5000 | 79 | none | none |
| 4 | 14000 | 73 | none | none |

*1: Etching residue was evaluated by observing whether Al residue was observed at spacing between the electrodes or not.
*2: The 0.6 $\mu$m-thick silicon oxide ($SiO_2$) film was formed by plasma CVD using tetraethoxysilane over the line and space pattern of Al electrodes and then subjected to heating at 300° C. in $N_2$ atmosphere for 2 hours. The state of the $SiO_2$ film after the heating was observed with respect to the presence or absence of the peeling.

The etching of Ag film may be performed by wet etching using any one of the following etchants.

(1) sulfuric acid+chromium oxide,
(2) sulfuric acid+potassium bichromate+sodium chloride,
(3) ammonium hydroxide+hydrogen peroxide aqueous solution,
(4) ferric chloride aqueous solution.

As described above, according to the present invention, illumination light from the sun or an artificial light source, after passing through the liquid crystal layer, is incident to the scanning electrode surface to be reflected thereat at a relatively high reflectivity. Further, the reflective electrode surface is provided with a light-diffusive characteristic due to roughening thereof, so that the reflected light enters the viewer's eyes uniformly and the viewer can observe a paper-felt image quality free from bright-dark irregularity on the panel face.

What is claimed is:

1. A liquid crystal apparatus including a liquid crystal panel comprising a pair of a back side substrate and a viewer's side substrate disposed opposite to each other, and a liquid crystal disposed between the substrates; wherein
    the back side substrate is provided with a plurality of scanning electrodes for applying a scanning signal to the liquid crystal,
    the viewer's side substrate is provided with a plurality of transparent data electrodes for applying data signals to the liquid crystal,
    the scanning electrodes comprise a reflective and diffusive surface of a metal so as to reflect light incident thereto through the viewer's side substrate,
    a housing for holding the liquid crystal panel, and
    a lid openably supported by the housing, wherein said lid has a front surface forming a surface of the liquid crystal apparatus in its closed state, and the lid comprises a light-transmissive diffusive sheet so as to allow external light incident to the front surface to pass therethrough as diffused light in its opened state.

2. A liquid crystal apparatus including a liquid crystal panel comprising a pair of a back side substrate and a viewer's side substrate disposed opposite to each other, and a liquid crystal disposed between the substrates; wherein
    the back side substrate is provided with a plurality of scanning electrodes for applying a scanning signal to the liquid crystal,
    the viewer's side substrate is provided with a plurality of transparent data electrodes for applying data signals to the liquid crystal,
    the scanning electrodes comprise a reflective and diffusive surface of a metal so as to reflect light incident thereto through the viewer's side substrate,
    a housing for holding the liquid crystal panel, and
    a lid openably supported by the housing, wherein said lid has a front surface forming a surface of the liquid crystal apparatus in its closed state and a back surface opposite to the front surface, and the lid comprises a light-reflective diffusive sheet so as to allow external light incident to the back surface to be reflected thereat as diffused light in its opened state.

3. A liquid crystal apparatus according to claims 1 or 2, wherein said metal contains at least one of oxygen or carbon.

4. A liquid crystal apparatus according to claims 1 or 2, wherein said metal comprises silver or aluminum.

5. A liquid crystal apparatus according to claims 1 or 2, wherein said metal contains at least one of oxygen or carbon.

6. A liquid crystal apparatus according to claims 1 or 2, wherein said reflective and diffusive surface is provided with a plurality of surface unevennesses.

7. A liquid crystal apparatus according to claims 1 or 2, wherein the liquid crystal is driven to effect optical modulation according to a birefringence mode.

8. A liquid crystal apparatus according to claims 1 or 2, further including a housing for holding the liquid crystal panel, and a lid openably supported by the housing, said lid having a light-diffusive surface.

9. A liquid crystal apparatus according to claims 1 or 2, further including a lid-holding means for pivotally supporting the lid and for holding the lid at an acute angle with respect to the liquid crystal panel in the opened state of the lid.

10. A liquid crystal apparatus according to claims 1 or 2, wherein the scanning electrodes comprise a film of aluminum or its alloy formed by sputtering in a sputtering atmosphere of an inert gas containing a minor amount of $CO_2$.

11. A liquid crystal apparatus according to claims 1 or 2, wherein the scanning electrodes comprise a film of silver or its alloy formed by sputtering in a sputtering atmosphere of an inert gas containing a minor amount of $CO_2$.

12. A liquid crystal apparatus according to claim 11, wherein said scanning electrodes comprise a film of silver or silver alloy, the film further containing oxygen so as to provide the scanning electrodes with a diffusive surface.

13. A liquid crystal apparatus according to claim 10, wherein said scanning electrodes comprise a film of aluminum or aluminum alloy, the film further containing oxygen so as to provide the scanning electrodes with a diffusive surface.

14. A liquid crystal apparatus according to claim 11, wherein said scanning electrodes comprise a film of silver or silver alloy, the film further containing carbon and oxygen so as to provide the scanning electrodes with a diffusive surface.

15. A liquid crystal apparatus according to claim 10, wherein said scanning electrodes comprise a film of aluminum or aluminum alloy, the film further containing carbon and oxygen so as to provide the scanning electrodes with a diffusive surface.

16. A liquid crystal apparatus including a liquid crystal panel comprising a pair of a back side substrate and a viewer's side substrate disposed opposite to each other, and a liquid crystal disposed between the substrates; wherein the back side substrate is provided with a plurality of scanning electrodes for applying a scanning signal to the liquid crystal, the viewer's side substrate is provided with a plurality of transparent data electrodes for applying data signals to the liquid crystal, the scanning electrodes comprise a reflective and diffusive surface of a metal so as to reflect light incident thereto through the viewer's side substrate, and wherein said reflective and diffusive surface is provided with a plurality of unevennesses having an average difference in height between projections and indentations of 0.1–0.2 $\mu$m.

17. A liquid crystal apparatus according to claim 16, wherein the liquid crystal is disposed in a layer having a thickness of 0.5–2 $\mu$m.

18. A liquid crystal apparatus according to claim 16 wherein the average difference in height between projections and indentations is 0.12–0.2 $\mu$m.

19. A liquid crystal apparatus including a liquid crystal panel comprising a pair of a back side substrate and a viewer's side substrate disposed opposite to each other, and a liquid crystal disposed between the substrates; wherein the back side substrate is provided with a plurality of scanning electrodes for applying a scanning signal to the liquid crystal, the viewer's side substrate is provided with a plurality of transparent data electrodes for applying data signals to the liquid crystal, the scanning electrodes comprise a reflective and diffusive surface of a metal so as to reflect light incident thereto through the viewer's side substrate, and a lid-holding means for pivotally supporting the lid and for holding the lid at an acute angle with respect to the liquid crystal panel in the opened state of the lid.

* * * * *